United States Patent
Meguro et al.

(10) Patent No.: US 6,487,878 B1
(45) Date of Patent: Dec. 3, 2002

(54) METHOD FOR MANUFACTURING A DISCHARGE TUBE

(75) Inventors: Takeshi Meguro, Osaka (JP); Masaji Sakamoto, Osaka (JP); Kenji Hirai, Osaka (JP); Motomi Sakoda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/490,749

(22) Filed: Jan. 25, 2000

(30) Foreign Application Priority Data

Jan. 27, 1999 (JP) .......................................... 11-018407

(51) Int. Cl.[7] ........................................... C03B 23/057
(52) U.S. Cl. ............................. 65/34; 65/103; 65/108; 65/109; 65/270; 65/271; 65/392; 264/430
(58) Field of Search ........................ 65/392, 103, 108, 65/109, 270, 271, 34; 264/430

(56) References Cited

U.S. PATENT DOCUMENTS

| | | | |
|---|---|---|---|
| 4,045,201 A | * | 8/1977 | Caffarella et al. .............. 65/270 |
| 4,146,380 A | * | 3/1979 | Caffarella et al. .............. 65/105 |
| 4,476,150 A | | 10/1984 | Rose |
| 5,406,172 A | | 4/1995 | Bennett |
| 5,407,119 A | * | 4/1995 | Churchill et al. ......... 228/124.5 |
| 5,512,078 A | * | 4/1996 | Griffin .................... 219/121.62 |

FOREIGN PATENT DOCUMENTS

| | | |
|---|---|---|
| JP | 57-109234 | 7/1982 |
| JP | 58-78348 | 5/1983 |
| JP | 63-281342 | 11/1988 |

OTHER PUBLICATIONS

European Search Report dated Apr. 10, 2000.

* cited by examiner

Primary Examiner—James Derrington
(74) Attorney, Agent, or Firm—Merchant & Gould P.C.

(57) ABSTRACT

A method for manufacturing a discharge tube, including heating a quartz tube by irradiation and closing it shut, is presented, in which variation of the heating temperature of the quartz tube can be reduced. Laser light is irradiated on a portion of the quartz tube, and in the step of sealing the portion of the quartz tube onto which laser light has been irradiated, the laser light is scanned while oscillating back and forth. The intensity of the laser light is controlled such that the intensity of the laser light when the size of a displacement of the laser light is maximal is smaller than the intensity of the laser light when the size of the displacement of the laser light is minimal.

21 Claims, 8 Drawing Sheets

METHOD FOR MANUFACTURING A DISCHARGE TUBE

BACKGROUND OF THE INVENTION

1. Field of the Invention

The present invention relates to a method for manufacturing a discharge tube. More particularly, the present invention relates to a method for manufacturing a discharge tube, characterized by its sealing step for sealing the translucent insulating tube.

2. Description of the Prior Art

Discharge tubes have a pair of electrodes opposing each other inside a quartz tube, which is filled with a certain gas and discharge material. To seal the discharge tube, a portion of the quartz tube is usually softened by heating it and then sealed shut. Generally, an oxygen-hydrogen burner is used for the heat source. However, because it is very difficult to keep the region heated by the burner small, there is a possibility that other portions of the quartz tube besides the portion to be sealed are heated as well and deformed. Especially, deformations of the part serving as the discharge space of the discharge tube are a problem, because they have a large influence on the characteristics of a discharge lamp using this discharge tube. Another problem is the possibility that the hydrogen in the flame of the oxygen-hydrogen burner is absorbed by the quartz glass, which deteriorates the characteristics of the discharge tube.

To solve these problems, it has been proposed to use laser light as the light source for heating the quartz tube (see e.g. Publication of Unexamined Japanese Patent Application (Tokkai) No. S57-109234 or Tokkai S58-78348). For example, Tokkai S58-78348 discloses heating and sealing the quartz tube by irradiating laser light, by scanning it along the tube axis of the quartz tube with a certain amplitude.

However, if the quartz tube is heated by irradiation with laser light that is scanned with a constant amplitude, temperature variations arise in the heating temperature of the quartz tube. A resulting problem is that there is a possibility that the discharge tube bursts during processing, and because there are large variations in the pressure resistance of the seal, there is a possibility of cracks in the discharge tubes occurring during use.

SUMMARY OF THE INVENTION

It is an object of the present invention to provide a method for manufacturing a discharge tube including a step of sealing a translucent insulating tube with laser light, wherein variations in the heating temperature of the translucent insulating tube can be reduced, and a discharge tube of high quality can be produced with high reliability.

To achieve these objects, a method for manufacturing a discharge tube in accordance with the present invention comprises irradiating laser light on a portion of a translucent insulating tube, and sealing the portion of the translucent insulating tube onto which laser light has been irradiated. The irradiation of the laser light is performed while (i) scanning the laser light to oscillate back and forth along a tube axis of the translucent insulating tube, and (ii) changing at least one of an intensity of the laser light and an amplitude of the oscillation of the laser light. With this configuration, variations in the heating temperature of the translucent insulating tube can be reduced, and a discharge tube of high quality can be produced with reliability. In addition, it is easy to achieve optimal heating in accordance with several external conditions in the step of heating the discharge tube, because it is possible to heat the translucent insulating tube locally and selectively.

In this method, it is preferable that the irradiation of the laser light is performed while changing the intensity of the laser light such that the intensity of the laser light when a size of a displacement of the laser light is maximal is smaller than the intensity of the laser light when the size of the displacement of the laser light is minimal. Here, "displacement" refers to a vector expressing the irradiation position of laser light, whose direction corresponds to a direction along the tube axis of the translucent insulating tube, and whose magnitude (i.e. size) corresponds to the distance from an average irradiation position, wherein "average irradiation position" corresponds, for example, to a central portion of the irradiation region.

Figure 7:
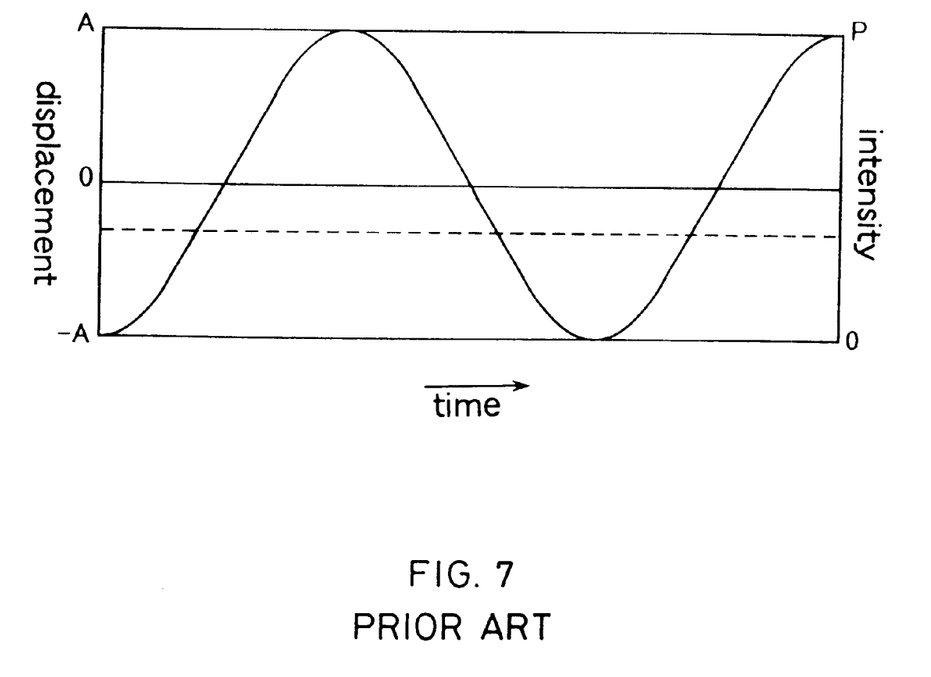
FIG. 7 shows an intensity pattern of the laser light in a conventional manufacturing method.
Figure 8:
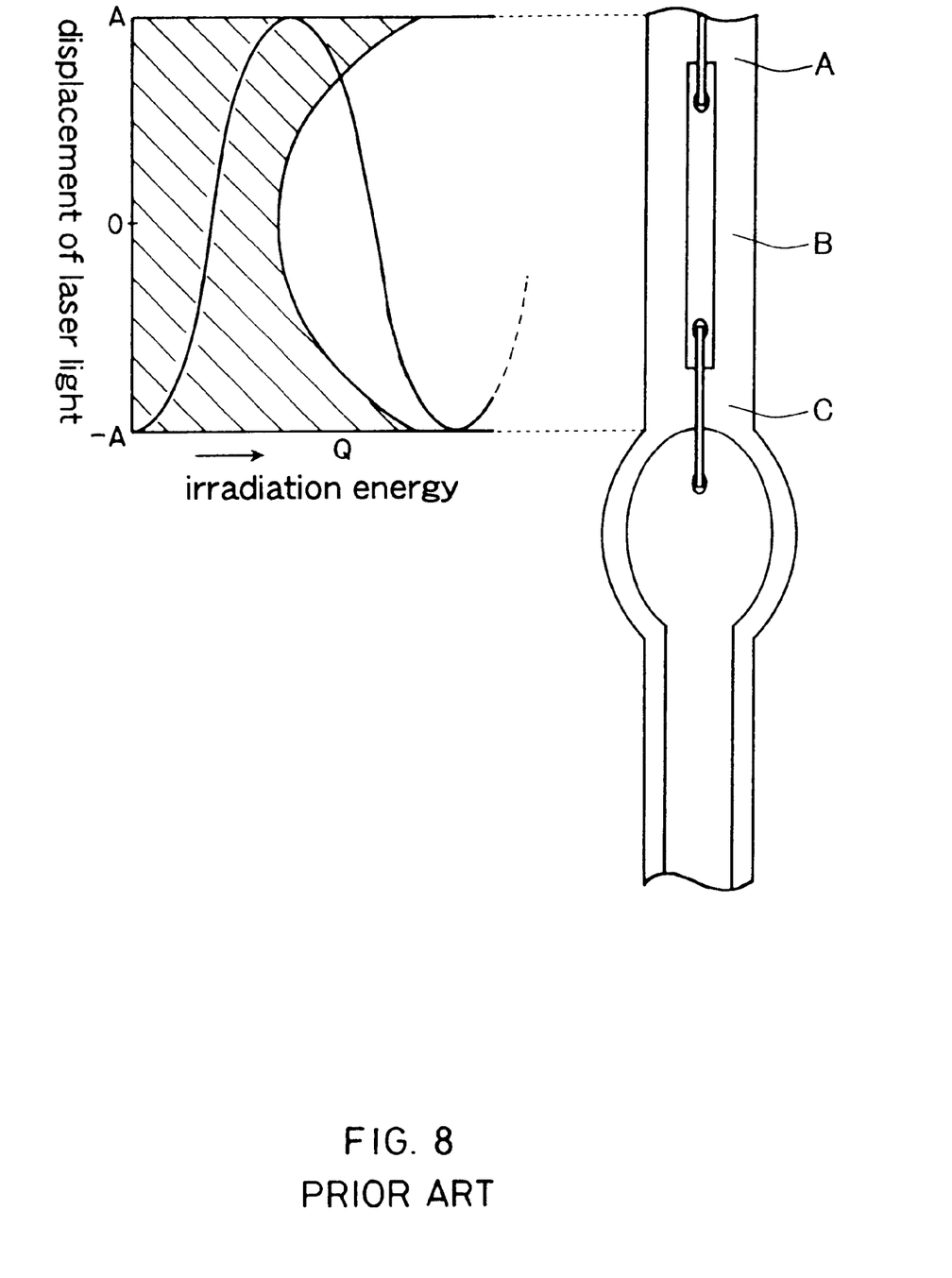
FIG. 8 shows the irradiation energy distribution of laser light for the case of an irradiation with the intensity pattern shown in FIG. 7.

FIG. 7 shows the temporal change of the displacement and the intensity of the laser light in conventional step of sealing the discharge tube with laser light. The solid line in FIG. 7 marks the displacement of the laser light, and the broken line marks the intensity of the laser light. FIG. 8 shows the distribution of the irradiation energy of the laser light when the irradiation of the laser light is performed as shown in FIG. 7. If the laser light is oscillated and irradiated with a constant intensity and amplitude, the irradiation energy at the portions where the size of the displacement of the laser light is maximal (i.e. the end portions of the irradiation region near the points "A" and "C" in FIG. 8) tends to be high, and the irradiation energy at the portions where the size of the displacement of the laser light is minimal (i.e. the center portion of the irradiation region near point "B" in FIG. 8) tends to be low. This non-uniformity of the irradiation energy becomes one of the reasons for variations of the heating temperature.

However, in accordance with the above-mentioned preferable manufacturing method of the present invention, the intensity of the laser light is varied depending on the size of the displacement, so that the above noted non-uniformities in the irradiation energy can be relaxed and variations in the heating temperature of the translucent insulating tube can be reduced.

In this preferable configuration, it is even more preferable that the intensity of the laser light is changed stepwise or continuously such that the intensity of the laser light is reduced with an increase of the size of the displacement of the laser light, and the intensity of the laser light is increased with a reduction of the size of the displacement of the laser light.

In this configuration, it is preferable that the irradiation of the laser light is performed while changing the intensity of the laser light such that the intensity of the laser light is smaller when a scanning speed of the laser light is minimal than when the scanning speed of the laser light is maximal.

As has been mentioned above, the distribution of the irradiation energy of the laser light in conventional manufacturing methods is such that the irradiation energy is high at the ends of the irradiation region and low at the center thereof. The reason for this is that the scanning speed of the laser light at the ends of the irradiation region is low, whereas it is high in the center, because ordinarily, the scanning of the laser light lets the position of the laser light change with a trigonometric function over time. In the regions where the scanning speed is slow, the laser light is irradiated for a longer time then in regions where the scanning speed is high, so that if the intensity of the laser light is constant as in the conventional manufacturing methods, the regions with low scanning speed absorb more energy than the regions with high scanning speed.

However, with the above-noted preferable configuration of the present invention, the intensity of the laser light is varied depending on the scanning speed, so that the above-noted non-uniformities in the irradiation energy caused by the differences in the scanning speed can be reduced and variations in the heating temperature of the translucent insulating tube can be reduced.

In this preferable configuration, it is even more preferable that the intensity of the laser light is changed stepwise or continuously such that the intensity of the laser light is increased with an increase of the scanning speed of the laser light, and the intensity of the laser light is reduced with a reduction of the scanning speed of the laser light.

Furthermore, it is preferable that the irradiation of the laser light is performed while contacting with a coolant a portion of the translucent insulating tube where the laser light is not irradiated. In this case, it is even more preferable that the intensity of the laser light is changed such that the intensity of the laser light when scanning a portion that is closest to a portion of the translucent insulating tube contacting the coolant is larger than the intensity of the laser light when scanning a portion that is farthest away form a portion of the translucent insulating tube contacting the coolant.

If the irradiation of the laser light is preformed while contacting a portion of the translucent insulating tube with a coolant, energy can be dissipated easier from the region that is close to the portion contacting the coolant than from the region further away, so that the heating temperature tends to be lower. However, in the above-noted preferable configuration, the intensity of the laser light when scanning a portion that is closer to a portion contacting the coolant is larger than the intensity of the laser light when scanning a portion that is farther away, so that the energy irradiated on a portion closer to a portion contacting the coolant can be larger, and variations in the heating temperature of the translucent insulating tube can be reduced.

Furthermore, it is preferable that the irradiation of the laser light is performed while rotating the translucent insulating tube around a tube axis of the translucent insulating tube, because this reduces variations in the heating temperature along the circumference of the translucent insulating tube.

The laser light can be emitted by a laser selected from the group consisting of a carbon gas laser, an excimer laser, a YAG laser and a semiconductor laser. A material for the translucent insulating tube is selected from the group consisting of quartz glass, borosilicate glass, and translucent alumina.

DESCRIPTION OF THE PREFERRED EMBODIMENTS

Figure 2:
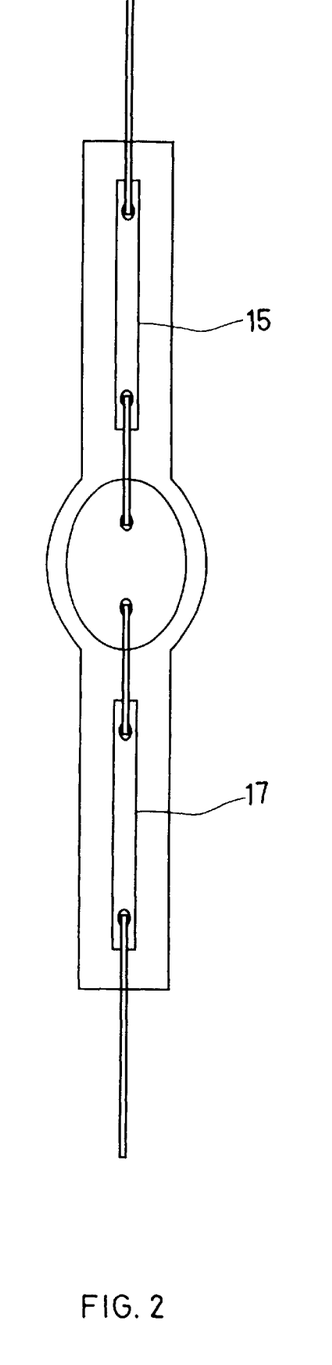
FIG. 2 is shows the structure of a discharge tube that can manufactured with the manufacturing method of the present invention.

FIG. 2 is a top view showing the structure of a discharge tube made with the manufacturing method of the present invention. A pair of electrodes 15 and 17 oppose each other inside a quartz tube, which is filled with an inert gas, mercury and a metal halide. The electrodes 15 and 17 include an electrode coil portion made by inserting an electrode rod into a coil, a metal foil made e.g. of molybdenum, and a lead wire, which are connected to each other.

Figure 1:
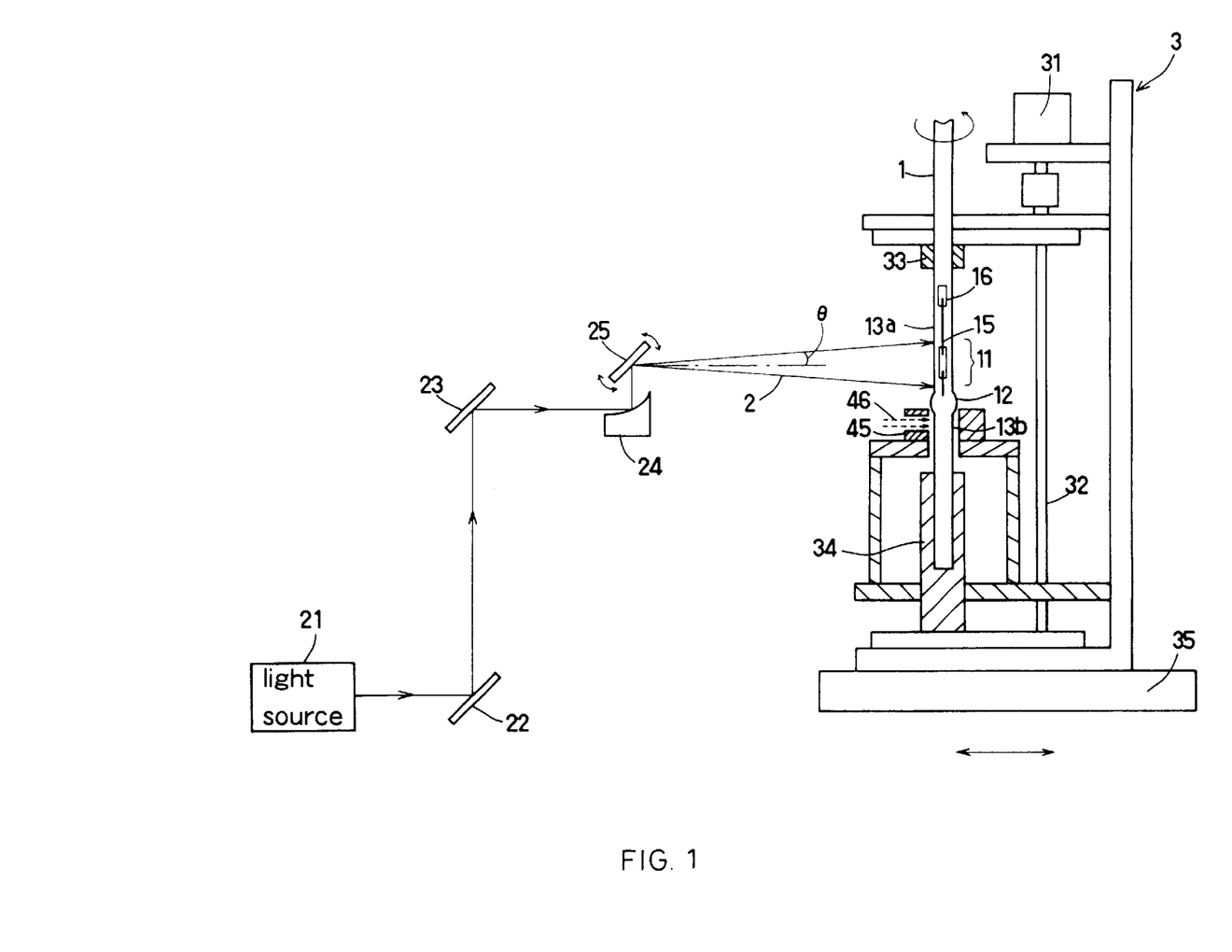
FIG. 1 is shows the structure of a sealing apparatus that can be used for the manufacturing method of the present invention.

FIG. 1 is a schematic drawing showing an example of a sealing apparatus used for the method for manufacturing a discharge tube of the present invention. This sealing apparatus includes a quartz tube support mechanism 3 and a laser irradiation mechanism. The quartz tube support mechanism 3 includes support portions 33 and 34 provided on a movable table 35, which are connected to a motor 31 through a member 32. The quartz tube support mechanism 3 is also provided with a coolant nozzle 45. The quartz tube support mechanism 3 is further provided with pinchers for sealing the quartz tube, and an electrode holding member, such as a magnet, which are not shown in the drawings.

The laser irradiation mechanism includes a light source 21, reflecting mirrors 22 and 23, a convex reflecting mirror (parabolic mirror) 24, and a reflecting mirror (scanning mirror) 25 whose inclination angle can be controlled by a remote control operation. The relative positions among the light source 21 and the reflecting mirrors 22 to 25 are such that the laser light from the light source 21 is guided onto the parabolic mirror 24 by adjusting the light path with the reflecting mirrors 22 and 23, and the laser light can be focused by the parabolic mirror 24 onto the reflecting surface of the scanning mirror 25.

For the light source 21, it is possible to use a carbon gas laser, an excimer laser, a YAG (yttrium aluminum garnet) laser a semiconductor laser or any other light source customarily used for laser processing. In particular, a carbon gas laser is preferable, because its main wavelength is about 10$\mu$m, and can be absorbed easily by the quartz tube. The light source 21 also comprises a control mechanism (not shown in the drawings), controlling the intensity of the laser light in accordance with the inclination angle of the reflection surface of the scanning mirror 25.

The relative position of the quartz tube support mechanism 3 and the laser irradiation mechanism is such that the laser light 2 reflected by the scanning mirror 25 is irradiated onto a certain region 11 of the quartz tube 1. The distance between the laser irradiation mechanism and the quartz tube 1 supported by the quartz tube support mechanism 3 is one of the factors determining the spot diameter of the laser light 2 irradiated on the quartz tube. The distance between the laser irradiation mechanism and the quartz tube 1 can be adjusted with the movable table 35. There is no particular limitation to the spot diameter, but it is preferable that the spot diameter is adjusted to be 1 to 200% of the diameter of the quartz tube.

The following is a more detailed explanation of the manufacturing method of the present invention, in conjunction with an explanation of how this sealing apparatus operates. In particular, the following explanations relate to an example of manufacturing a discharge tube with the structure shown in FIG. 2.

First of all, the quartz tube 1 is made by heating and softening a portion of a straight quartz tube and forming it into a spherical tube. Thus, a quartz tube 1 is obtained, which has straight side tubes 13a and 13b arranged symmetrically on both ends of a spherical tube 12.

After the first electrode 15 has been inserted into the side tube 13a, the side tube 13a is sealed as explained below (this step is referred to as "the first sealing step" in the following). It is preferable that the first sealing step is performed while evacuating the quartz tube 1.

First of all, the quartz tube 1, into which the first electrode 15 has been inserted, is put into the sealing apparatus, so as to be supported with the support portions 33 and 34. The position of the first electrode 15 inside the quartz tube 1 is adjusted by a reciprocal action, such as magnetism, working between the electrode holding member of the sealing apparatus and the metal foil of the electrode. After the quartz tube 1 has been set in the sealing apparatus, the motor 31 is started. This causes the quartz tube 1 to rotate around the tube axis (i.e. the axis through the center of the tube).

Then, laser light 2 is emitted from the light source 21, reflected and guided by the reflecting mirror 22, the reflecting mirror 23, the parabolic mirror 24, and the scanning mirror 25, and irradiated onto a certain region 11 of the quartz tube 1. This region 11 corresponds to the portion of the metal foil of the first electrode 15 and its surroundings.

The laser light is irradiated while changing the inclination angle of the reflection surface of the scanning mirror 25 within a certain range. Thus, the laser light 2 oscillates back and forth and scans the region 11 of the quartz tube 1. The inclination angle of the reflection surface of the scanning mirror 25 can be controlled to change, for example, like a trigonometric function over time. Here, the "inclination angle" is equal to the angle θ between the laser light 2 reflected from the scanning mirror 25 and the direction perpendicular to the tube axis of the quartz tube 1.

The displacement of the laser light 2 changes over time like a trigonometric function. Thus, the scanning speed of the laser light is not constant, but the scanning speed is smaller the larger the size of the displacement is, and the scanning speed is larger the smaller the size of the displacement is. Here, "displacement" is a value expressing the irradiation position of the laser light, taking the irradiation position for θ=0 as a reference.

The intensity of the laser light for irradiation is changed depending on the inclination angle of the reflecting surface of the scanning mirror 25. The intensity of the laser light is controlled so as to change stepwise or continuously with the change of θ. When θ is large and the size of the displacement of the laser light is large, the intensity of the laser light is reduced to a small value. In other words, when the scanning speed of the laser light is small, the intensity of the laser light is reduced to a small value.

In other words, the intensity of the laser light is controlled in a manner that the intensity when the size of the displacement of the laser light is maximal is smaller than the intensity when the size of the displacement of the laser light is minimal. Taking the intensity of the laser light when the size of the displacement of the laser light is minimal as 100%, the intensity of the laser light when the size of the displacement of the laser light is maximal is, for example, 0 to 99%, preferably 0 to 95%, more preferably 10 to 50%, most preferably 20 to 40%.

Figure 3:
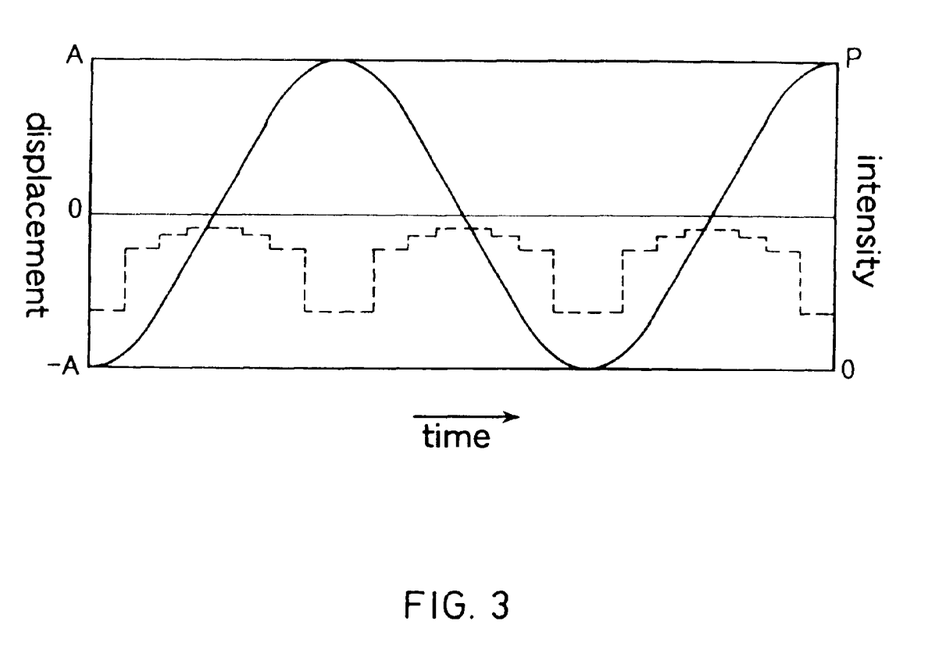
FIG. 3 is shows an intensity pattern of the laser light that is suitable for the first sealing step of the manufacturing method of the present invention.

For example, the first sealing step can be performed with a control pattern as shown in FIG. 3, which shows the control pattern for a quartz tube of 4 mm diameter and 1 mm wall thickness. In FIG. 3, the solid line marks the displacement of the laser light, whereas the broken line marks the intensity of the laser light. In this embodiment, the displacement of the go laser light oscillates as a trigonometric function over time. The frequency of the laser light oscillations is 20 Hz, and their amplitude is a constant 12 mm. Depending on the change of θ (i.e., the change of the size of the displacement of the laser light), the intensity of the laser light is changed stepwise. The intensity of the laser light is set to 500 W when the size of the displacement of the laser light is minimal, and to 150 W when the size of the displacement of the laser light is maximal. With this intensity control, the energy distribution of the laser light is adjusted to substantially the same value for all points (A, B and C), as shown by the hatched portion in FIG. 4.

The region 11 of the quartz tube 1 heats up as it absorbs the laser light 2, and its temperature rises accordingly. As explained above, inside the region 11, the irradiation energy of the laser light is substantially uniform, so that variations of the heating energy in the quartz tube 1 can be kept relatively small. There is no particular limitation on the heating temperature in the region 11, as long as it is sufficient to heat the quartz tube 1 to a temperature where it can be deformed.

Then, the region 11, which has been softened by laser light irradiation, is sealed shut by clamping it with the pinchers.

After this, the quartz tube 1 is flipped upside down, and after evacuating the inside of the quartz tube 1 from the side tube 13b of the quartz tube 1, the quartz tube 1 is filled with hydrogen and a metal halide. Then, after inserting the second electrode into the side tube 13b, an inert gas is introduced into the quartz tube 1.

Subsequently, a certain region of the quartz tube 1, namely the region corresponding to the portion where the metal foil of the second electrode 17 has been inserted, is heated and sealed by irradiation of laser light (in the following, this step is also referred to as "the second sealing step"). This second sealing step is performed while cooling the quartz tube 1 by constantly spraying a coolant 46, such as liquid nitrogen, from the coolant nozzle 45 onto a portion of the quartz tube 1.

The second sealing step can be performed substantially in the same manner as the first sealing step, except that the intensity pattern of the laser light is different.

As in the first sealing step, the intensity of the laser light for the second sealing step is controlled in a manner that the intensity when the size of the displacement of the laser light is maximal is smaller than the intensity when the size of the displacement of the laser light is minimal. Moreover, the intensity when the laser light scans the end of the irradiation region near the portion contacting the liquid nitrogen 46, is larger than the intensity when the laser light scans the end of the irradiation region away from the portion contacting the liquid nitrogen 46.

Taking the intensity of the laser light when the size of the displacement of the laser light is minimal as 100%, the intensity of the laser light when scanning the end of the irradiation region near the portion contacting the liquid nitrogen 46 is, for example, 1 to 99%, preferably 5 to 95%, more preferably 30 to 90%, most preferably 50 to 70%, and the intensity of the laser light when scanning the end of the irradiation region away from the portion contacting the liquid nitrogen 46 is, for example, 0 to 98%, preferably 0 to 90%, more preferably 10 to 50%, most preferably 20 to 40%.

Figure 5:
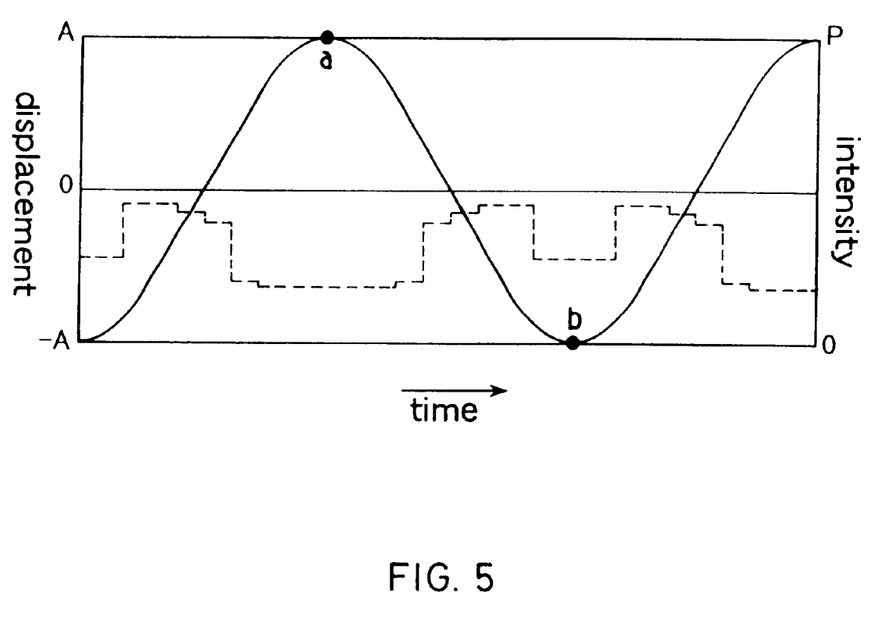
FIG. 5 is shows an intensity pattern of the laser light that is suitable for a second sealing step of the manufacturing method of the present invention.

For example, the second sealing step can be performed with a control pattern as shown in FIG. 5, which shows the control pattern for a quartz tube of 4 mm diameter and 1 mm wall thickness. In FIG. 5, the solid line marks the displacement of the laser light, wheras the broken line marks the intensity of the laser light. In this embodiment, the frequency of the laser light oscillations is 20 Hz, and their amplitude is 12 mm. Depending on the change of θ (i.e., the change of the size of the displacement of the laser light), the intensity of the laser light is changed stepwise. When the size of the displacement of the laser light is maximal, there are two cases, depending on the direction of the laser light displacement (marked as the points "a" and "b" in FIG. 5) In this embodiment, the intensity of the laser light at point "b" is set to be larger than the intensity of the laser light at point "a". To be specific, the intensity of the laser light is set to 800 W when the size of the displacement of the laser light is minimal, to 150 W at point "a", and to 500 W at point "b". With this intensity control, the irradiation energy is large in the vicinity of point "F", which is near the portion contacting the liquid nitrogen 46, and small in the vicinity of point "D", as shown by the hatched region in FIG. 6.

When laser light is irradiated onto a region of the quartz tube 1, the quartz tube 1 absorbs the laser light and heats up, and its temperature rises accordingly. As in the first sealing step, there is no particular limitation on the peak heating temperature, as long as it is sufficient to heat the quartz tube 1 to a temperature where it can be deformed.

As explained above, the second sealing step is performed while contacting a portion of the quartz tube 1 with liquid nitrogen 46, so that in a region that is close to the portion contacting the liquid nitrogen 46, the temperature tends to be lower than in a region that is far from the portion contacting the liquid nitrogen 46. If the second sealing step would be performed, for example, with an intensity pattern as shown in FIG. 3, the heating temperature of the laser light becomes lower from point "D" to point "E" to point "F".

However, if the intensity of the laser light is controlled as explained above, the irradiation energy in the region that is close to the portion contacting the liquid nitrogen 46 is controlled to be large, and the irradiation energy in the region that is far from the portion contacting the liquid nitrogen 46 is controlled to be small, so that the variation of the heating temperatures at all points of the irradiation region is kept relatively small.

After the region that has been softened by laser light irradiation is clamped with pinchers, unnecessary portions of the side tubes 13a and 13b are cut away, and a discharge tube is obtained.

The above explanations referred to an example where the laser light 2 is oscillated within the region 11 by changing the inclination angle of the scanning mirror 25. However, it is also possible to oscillate laser light 2 within the region 11 by moving the scanning mirror 25 along the tube axis direction of the quartz tube 1 while maintaining the scanning mirror 25 at a constant inclination angle.

Moreover, the above explanations referred to an example where the quartz tube is sealed by clamping it with pinchers.

However, it is also possible to seal the quartz tube by shrink sealing using a pressure difference between the inside and the outside of the quartz tube.

In the first sealing step and the second sealing step of the manufacturing method of the present invention, it is also possible to vary the amplitude of the laser light oscillations while keeping the intensity of the laser light constant, when irradiating the quartz tube with laser light. For this case, the amplitude of the laser light oscillations are controlled so as to obtain the energy distributions as explained for the above sealing steps.

Figure 4:
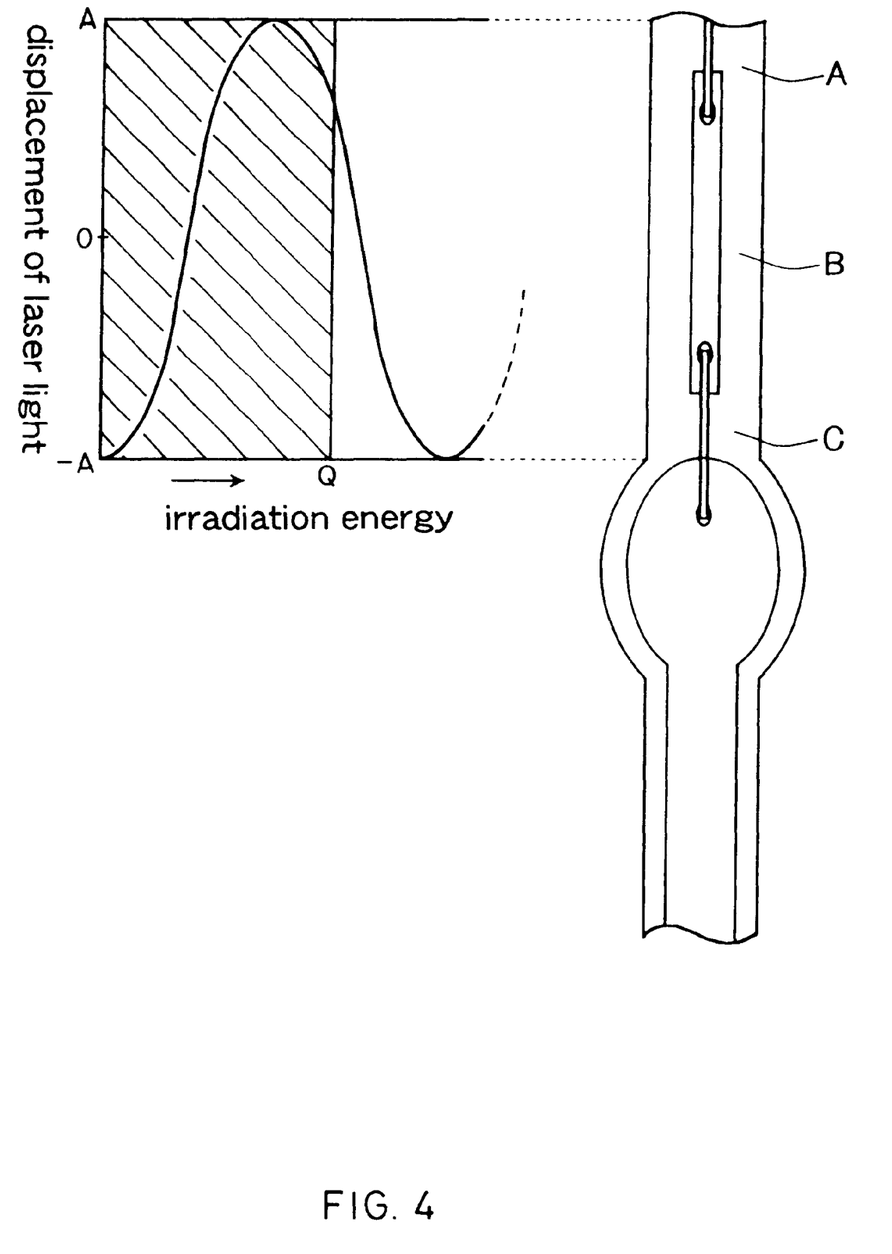
FIG. 4 shows the irradiation energy distribution of laser light for the case of an irradiation with the intensity pattern shown in FIG. 3.

For example, in the first sealing step, fixing a point serving as the reference for the laser light oscillations at the center of the irradiation region, the amplitude of the laser light oscillations can be increased over time. Controlling the laser oscillations like this, it becomes possible to attain an irradiation energy distribution as shown in FIG. 4, and it becomes possible to adjust the energy of the laser light irradiated at the various locations (A, B, and C) of the irradiation region to substantially the same energy.

Figure 6:
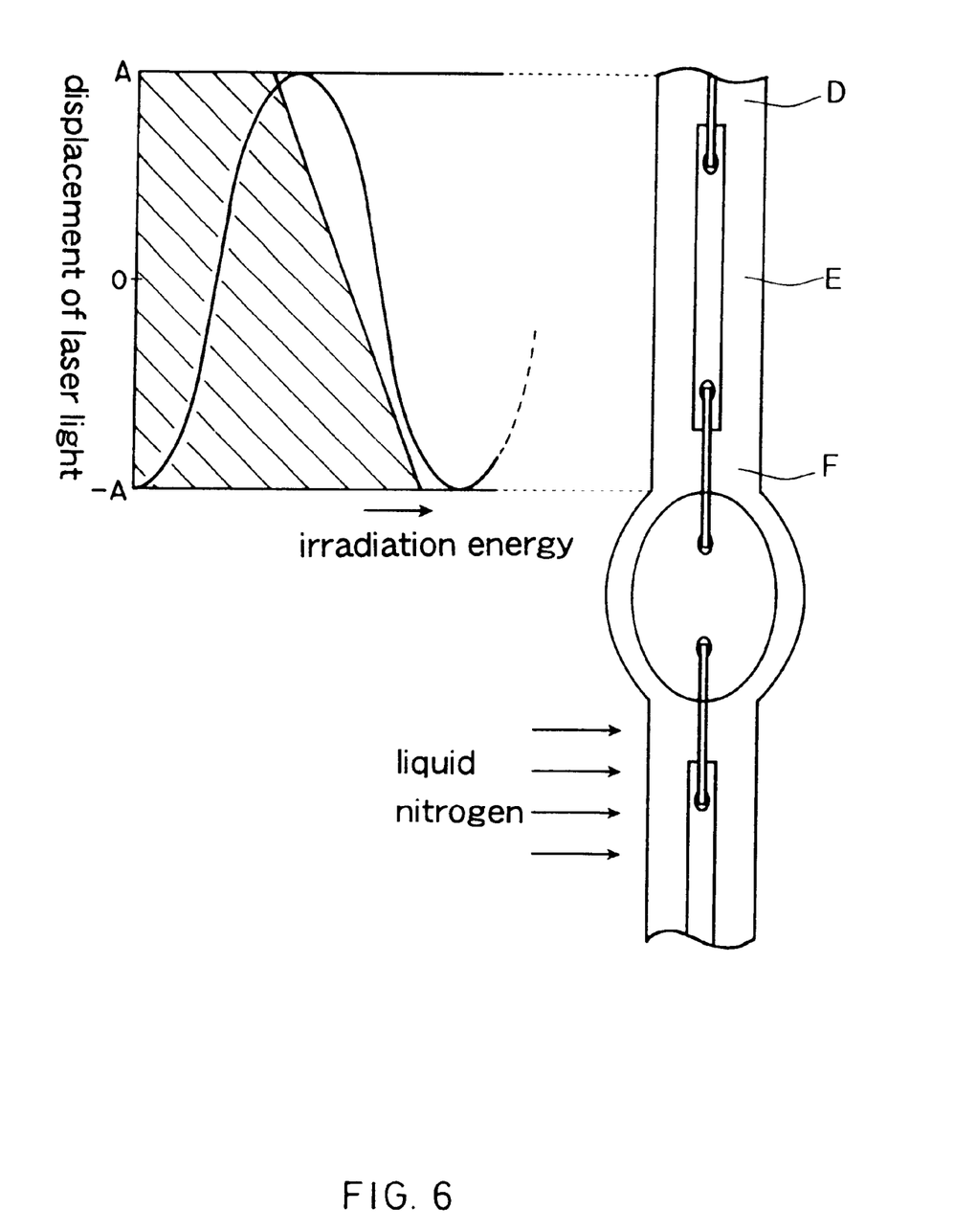
FIG. 6 shows the irradiation energy distribution of laser light for the case of an irradiation with the intensity pattern shown in FIG. 5.

In the second sealing step, the amplitude of the laser light oscillations can be increased over time while changing the point of reference for the laser oscillations. In this situation, it is possible to control the oscillations in a manner that when the amplitude of the oscillation is minimal the point serving as the reference for the laser light oscillations is closer to the portion contacting the liquid nitrogen than when the amplitude is maximal. With such a control, the irradiation energy distribution of the laser light has a gradient increasing from one end (point D) of the irradiation region to the other end (point F), as shown in FIG. 6.

In the first sealing step and the second sealing step of the manufacturing method of the present invention, it is further possible to change both the intensity of the laser light and the amplitude of the oscillations, when irradiating the quartz tube with laser light.

The above explanations pertained to an example in which a quartz tube was used for the translucent insulating tube, but the manufacturing method of the present invention is not limited to this configuration. For example, instead of quartz glass, it is also possible to use borosilicate glass, alumina, or any other translucent ceramic as the material for the translucent insulating tube.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A method for manufacturing a discharge tube, comprising:
   irradiating laser light on a portion of a translucent insulating tube; and
   sealing the portion of the translucent insulating tube onto which laser light has been irradiated;
   wherein irradiation of the laser light is performed while (i) scanning the laser light to oscillate back and forth along a tube axis of the translucent insulating tube, and (ii) changing at least one of an intensity of the laser light and an amplitude of the oscillation of the laser light; and
   wherein irradiation of the laser light is performed while contacting with a coolant a portion of the translucent insulating tube where the laser light is not irradiated.

2. The method according to claim 1, wherein irradiation of the laser light is performed while changing the intensity of the laser light such that the intensity of the laser light when a size of a displacement of the laser light is maximal is smaller than the intensity of the laser light when the size of the displacement of the laser light is minimal.

3. The method according to claim 2, wherein the intensity when the size of the displacement of the laser light is maximal is 0 to 99% of the intensity when the size of the displacement of the laser light is minimal.

4. The method according to claim 2, wherein the intensity when the size of the displacement of the laser light is maximal is 0 to 95% of the intensity when the size of the displacement of the laser light is minimal.

5. The method according to claim 2, wherein the intensity when the size of the displacement of the laser light is maximal is 10 to 50% of the intensity when the size of the displacement of the laser light is minimal.

6. The method according to claim 2, wherein the intensity when the size of the displacement of the laser light is maximal is 20 to 40% of the intensity when the size of the displacement of the laser light is minimal.

7. The method according to claim 2, wherein the intensity of the laser light is changed stepwise or continuously such that the intensity of the laser light is reduced with an increase of the size of the displacement of the laser light, and the intensity of the laser light is increased with a reduction of the size of the displacement of the laser light.

8. The method according to claim 1, wherein irradiation of the laser light is performed while changing the intensity of the laser light such that the intensity of the laser light is smaller when a scanning speed of the laser light is minimal than when the scanning speed of the laser light is maximal.

9. The method according to claim 8, wherein the intensity when the scanning speed of the laser light is minimal is 0 to 99% of the intensity when the scanning speed of the laser light is maximal.

10. The method according to claim 8, wherein the intensity when the scanning speed of the laser light is minimal is 0 to 95% of the intensity when the scanning speed of the laser light is maximal.

11. The method according to claim 8, wherein the intensity when the scanning speed of the laser light is minimal is 10 to 50% of the intensity when the scanning speed of the laser light is maximal.

12. The method according to claim 8, wherein the intensity when the scanning speed of the laser light is minimal is 20 to 40% of the intensity when the scanning speed of the laser light is maximal.

13. The method according to claim 8, wherein the intensity of the laser light is changed stepwise or continuously such that the intensity of the laser light is increased with an increase of the scanning speed of the laser light, and the intensity of the laser light is reduced with a reduction of the scanning speed of the laser light.

14. The method according to claim 1, wherein the intensity of the laser light is changed such that the intensity of the laser light when scanning a portion that is closest to a portion of the translucent insulating tube contacting the coolant is larger than the intensity of the laser light when scanning a portion that is farthest away from a portion of the translucent insulating tube contacting the coolant.

15. The method according to claim 14, wherein the intensity of the laser light when scanning a portion that is closest to a portion of the translucent insulating tube contacting the coolant is 1 to 99% of the intensity of the laser light when the size of the displacement of the laser light is minimal, and the intensity of the laser light when scanning a portion that is farthest away from a portion of the translucent insulating tube contacting the coolant is 0 to 98% of the intensity of the laser light when the size of the displacement of the laser light is minimal.

16. The method according to claim 14, wherein the intensity of the laser light when scanning a portion that is closest to a portion of the translucent insulating tube contacting the coolant is 5 to 95% of the intensity of the laser light when the size of the displacement of the laser light is minimal, and the intensity of the laser light when scanning a portion that is farthest away from a portion of the translucent insulating tube contacting the coolant is 0 to 90% of the intensity of the laser light when the size of the displacement of the laser light is minimal.

17. The method according to claim 14, wherein the intensity of the laser light when scanning a portion that is closest. to a portion of the translucent insulating tube contacting the coolant is 30 to 90% of the intensity of the laser light when the size of the displacement of the laser light is minimal, and the intensity of the laser light when scanning a portion that is farthest away from a portion of the translucent insulating tube contacting the coolant is 10 to 50% of the intensity of the laser light when the size of the displacement of the laser light is minimal.

18. The method according to claim 14, wherein the intensity of the laser light when scanning a portion that is closest to a portion of the translucent insulating tube contacting the coolant is 50 to 70% of the intensity of the laser light when the size of the displacement of the laser light is minimal, and the intensity of the laser light when scanning a portion that is farthest away from a portion of the translucent insulating tube contacting the coolant is 20 to 40% of the intensity of the laser light when the size of the displacement of the laser light is minimal.

19. The method according to claim 1, wherein irradiation of the laser light is performed while rotating the translucent insulating tube around a tube axis of the translucent insulating tube.

20. The method according to claim 1, wherein the laser light is emitted by a laser selected from the group consisting of a carbon gas laser, an excimer laser, a YAG laser and a semiconductor laser.

21. The method according to claim 1, wherein a main component of a material for the translucent insulating tube is selected from the group consisting of quartz glass, borosilicate glass, and translucent alumina.

* * * * *